United States Patent [19]

Smith et al.

[11] 3,872,353

[45] Mar. 18, 1975

[54] ELECTRONIC FLASHER CIRCUIT

[75] Inventors: Gerald D. Smith; Frank R. Owens, both of Indianapolis, Ind.

[73] Assignee: Carson Manufacturing Company, Inc., Indianapolis, Ind.

[22] Filed: Oct. 10, 1973

[21] Appl. No.: 404,996

[52] U.S. Cl. .......... 315/200 A, 307/202, 307/252 J
[51] Int. Cl. .......... H05b 37/00
[58] Field of Search ....... 307/202, 252 J; 315/200 A

[56] References Cited

UNITED STATES PATENTS 3,310,708 3/1967 Seidler .......... 315/200 A
3,439,189 4/1969 Petry .......... 307/252 J

*Primary Examiner*—Rudolph V. Rolinec
*Assistant Examiner*—Lawrence J. Dahl

[57] ABSTRACT

A circuit for cyclically flashing an electric lamp "on" and "off" by means of a circuit including a transistor protected from lamp surge currents occurring at the time of initial lamp energization and from currents due to a short circuit across the lamp terminals.

14 Claims, 3 Drawing Figures

ELECTRONIC FLASHER CIRCUIT

BACKGROUND OF THE INVENTION

This invention relates to flasher circuits and more particularly to an electronic circuit which repeatedly energizes and de-energizes one or more electric lamps in response to repetitive, time-spaced, automatically occurring switching signals.

The present invention embodies an improved circuit specifically designed to flash one or more electric lamps, particularly of the incandescent type, "on" and "off," by means of a low-voltage drop switching device such as a transistor. Flashing of an incandescent lamp involves initial surge currents of high order which usually damage transistors suitable for the purpose, especially so when the lamp is being operated at low ambient temperatures below zero degrees Fahrenheit. By protecting the transistor from this initial "turn on" surge, and permitting the lamp filament to at least partially heat up, the transistor may be utilized to handle the lower energizing currents which are well within its operating capabilities. The improved circuit of this invention provides such surge current protection as well as additional features which include sensing manual switch-off at the lamp during power application to the main circuitry and conditioning the latter to preclude damaging surge currents from being applied to the transistor upon switching the lamp back into the circuitry.

This invention utilizes in an electronic flasher first and second normally non-conductive semiconductor switching devices each having a control element and two current-conducting elements. The current-conducting elements are coupled in shunt. Two flasher-lamp electrodes and two power supply electrodes are series connected with two of said current-conducting elements of one of the switching devices. One of these switching devices is preferably a transistor and the other a silicon controlled rectifier (SCR). Means are provided for applying repetitive switching potentials simultaneously to both of the aforesaid control elements for rendering both the transistor and the SCR conductive. The SCR has a faster response time to the application of said switching potentials than the transistor whereby the SCR is rendered conductive in advance of the transistor. Thus, initial surge current to the lamp during turn-on is taken first by the SCR and the lower operating current by the transistor, the SCR being rendered ineffective upon the subsequent change to conductive state of the transistor.

It is an object of this invention to provide an improved electronic circuit for repeatedly energizing and de-energizing a flasher lamp at a predetermined rate.

It is another object to provide in an electronic flasher circuit surge current protection for a transistor which carries the full lamp current during all but a minor fraction of the lamp "on" time.

It is another object of this invention to provide in an electronic flasher circuit a sensing circuit for assuring proper switching operation upon disconnection and reconnection of the flasher lamp into the circuitry.

It is yet another object to provide in an electronic flasher circuit protection against short circuiting across the lamp terminals.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

In the drawings

Referring to FIG. 1, a simplified schematic of a portion of the operative embodiments of FIGS. 2 and 3 is shown. The embodiments disclosed may be used on motor vehicles such as school buses, trucks and the like having the usual twelve volt storage battery indicated by the numeral 10. The battery 10 is connected to terminals or electrodes 12 and 14 as shown which in turn are series connected to two electrodes or terminals 16 and 18 to which is connected a conventional incandescent flasher lamp 20. Series connected with these terminals are the current-conducting elements, the collector and emitter 22 and 24, of a normally non-conductive transistor 26, the emitter 24 being connected to a "B" supply bus 28 which is also connected to the positive electrode 14 of the battery 10.

Figures 1, 2:
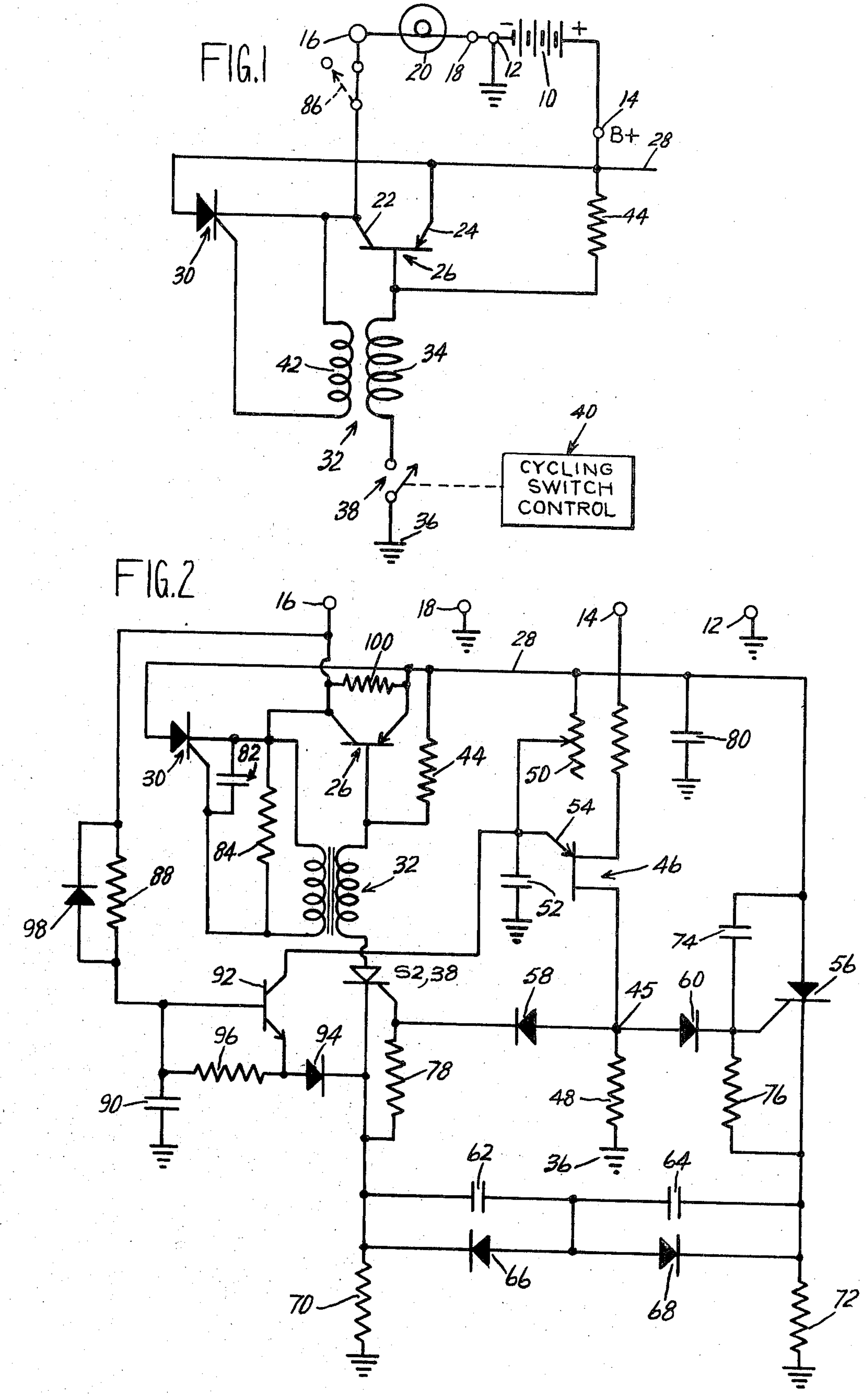
FIG. 1 is a simplified schematic diagram of an embodiment of this invention.
FIG. 2 is a circuit diagram of a first operative embodiment of this invention.

Shunt connected across the collector and emitter 22 and 24 are the current-conducting elements, the cathode and anode, respectively, of a normally non-conductive silicon controlled rectifier (SCR) 30. The transformer 32 (gate potential-generating device) has a primary winding 34 series connected between the control element or base of the transistor 26 and ground 36, a single pole single throw switch 38 being series connected between the winding 34 and ground as shown. A cycling switch control indicated generally by the block 40 has a connection with the switch 38 and operates to open and close the latter repetitively at a predetermined rate as will be explained more fully hereafter.

The secondary winding 42 of the transformer 32 is connected between the cathode and the control element or gate of the SCR 30. A suitable dropping resistor 44 is connected between the supply bus 28 and the base of the transistor 26.

In an operating embodiment of this invention, the SCR 30 is of considerably higher resistance and has a response time many times faster than that of the transistor 26. For one arrangement, the SCR 30 can be changed in conductivity state from non-conductive to conductive about twenty micro-seconds faster than that of the transistor 26.

The cycling switch control 40 is so arranged as to operate the switch 38 repetitively between closed and open conditions at a predetermined rate. Upon closure of the switch 38, base drive is applied to the normally non-conductive transistor 26 rendering it conductive. Simultaneously, a pulse voltage is developed in the winding 42 of the transformer 32 and applied to the SCR 30. Inasmuch as the response time of the SCR 30 is faster than that of the transistor 26, the SCR is rendered conductive thereby providing a energizing-current path to the lamp 20. A period of time later, for example twenty micro-seconds, the transistor 26 will be turned "on" and provide a second current-conducting path to the lamp 20. The voltage drop across the transistor falls to a value lower than the voltage across the SCR required to operate it, so the latter becomes non-conductive, the lamp current thereby passing solely through the transistor 26. In a typical circuit, the voltage drop across the transistor ranges in value from about 0.2 to 0.3 volt whereas the drop across the SCR is approximately 1 volt. The SCR 30 is so selected as to have a turn-on time of some ten to twenty times faster than that of the transistor 26. In the circuitry, it is desirable that the voltage drop to the lamp 20 be minimal; hence, it is necessary that the voltage drop across the switching devices 26 and 30 be quite low, thus, the reason for using the low voltage drop transistor 26.

Current initially drawn by the filament of the lamp 20 is quite high, for example 150–180 amperes but drops off after the filament increases in resistance with rise in temperature. Such initial surge currents will usually damage transistors of the type used in this invention such that some protection is needed to prevent such surge currents from being applied to the transistor. This protection is provided in the form of the SCR 30 which turns "on" in advance of the transistor 26 such that the filament in the lamp 20 heats to a value at which the current flow therein, for example nine amperes, is well within the capabilities of the transistor 26. Thus, when the transistor 26 changes to its conductive state, it carries the full operating current flow to the lamp 20. The SCR 30 thus protects the transistor 26 against the initial surge currents.

Upon opening the switch 38, base drive is removed from the transistor 26 thereby rendering it non-conductive cutting the current flow to the lamp 20. Upon reclosing the switch 38, the SCR 30 is first rendered conductive providing for initial current flow to the lamp 20 which is followed thereafter by transistor 26 becoming conductive and causing the SCR to be returned to its non-conductive state while supplying the full current flow to the lamp 20. Thus, with the repetitive opening and closing of the switch 38, the lamp 20 will be energized and de-energized correspondingly.

Circuitry is employed for serving the function of the switch 38 and cycling switch control 40. This circuitry is shown in FIG. 2 wherein like numerals will indicate like parts. The switch 38 FIG. 1 may be considered, in FIG. 2, as being the SCR 38, this SCR 38 being gated "on" and "off" by other circuitry now to be described. A unijunction transistor 46, normally non-conductive, in the circuit configuration of a relaxation oscillator, is series connected between the "B" supply bus 28 and ground 36 via a pulseforming resistor 48. A time constant circuit which includes variable resistor 50 and charging capacitor 52 is connected to the gate 54 as shown.

This circuitry is in the form of a somewhat conventional SCR timing inverter which includes the SCR 38 and another SCR 56, two diodes 58 and 60, two capacitors 62 and 64, two additional diodes 66 and 68 and two load resistors 70 and 72, all connected as shown. In particular, the diodes 58 and 60 are connected back to back to the resistor 48 and the two gates, respectively, of the SCR 38 and 56. The capacitors 62 and 64 are series connected between the cathodes of the two SCR's 38 and 56. The diodes 66 and 68 are also connected back to back between the same cathodes with the junction thereof being connected to the junction of the two connected capacitors 62 and 64. The load resistors 70 and 72 are series connected, respectively, to the cathodes of the two SCR's 38 and 56, respectively, and ground. The anode of the SCR 56 is connected to the supply bus 28. A capacitor 74 is connected between the gate and the anode of the SCR 56 while a resistor 76 is connected between the same gate and the cathode thereof. A like resistor is connected between the gate of SCR 38 and its cathode. A relatively large capacitor 80 is connected between the supply bus 28 and ground. A diode 82 is connected between the cathode and gate of the SCR 30 as is a resistor 84.

The circuitry described operates as follows. With the lamp connected to the terminals 16 and 18, upon application of power to the terminals 12 and 14, the capacitor 52 will start charging through the resistor 50. Upon reaching a predetermined value of charge, the normally non-conductive transistor 46 will be rendered conductive causing current to flow through the resistor 48. The capacitor 52 will discharge through the transistor 46 thereby dropping the bias on the gate 54 to a low value that cuts off transistor 46. This results in producing a pulse over the resistor 48 which is applied to both gates of the two SCRs 38 and 56. However, prior to the charge on the capacitor 52 reaching a value sufficient to trigger the transistor 46, the SCR 56, which is normally non-conductive is rendered conductive by the application to its gate of a voltage pulse via the capacitor 74. A voltage drop produced over the resistor 72 charges capacitor 64 via the diode 66 and resistor 70. The pulse now appearing at the junction 45 is applied to both gates of SCR's 38 and 56, but since the SCR 38 is in a non-conductive state, it is triggered conductive. Current flowing through the resistor 70 produces a voltage drop which is applied to the left-hand terminal of the capacitor 64 causing it to discharge into the cathode of SCR 56 turning the latter "off." This circuitry as described is commonly referred to as an SCR timing inverter which is documented in various publications including the General Electric SCR Manual. In the operation of this inverter, the SCR's 38 and 56 are alternately triggered between conductive and non-conductive states with the occurrence of each pulse at the junction 45. Upon rendering SCR 38 conductive, a lamp connected to the terminals 16 and 18 is energized as previously explained in connection with FIG. 1.

Recapitulating, when power is applied, the relaxation oscillator which includes the transistor 46 generates periodic pulses at the junction 45. These pulses are conducted by diodes 58 and 60 to the gates of the two SCR's 38 and 56, respectively. However, prior to the relaxation oscillator producing a first pulse at junction 45, SCR 56 is turned "on" by a pulse conducted through capacitor 74, establishing commutation of the SCR inverter circuit. Upon SCR 38 being triggered "on," base drive is applied to the transistor 26 and simultaneously therewith, a pulse is applied to the gate of SCR 30. SCR 30 is rendered conductive in advance of transistor 26 thereby carrying the initial surge current to the lamp load connected to the terminals 16 and 18. At very low temperatures, such initial search current may be as high as 180 amperes. Since the turn-on time of the transistor 26 is some ten to twenty times slower than that of the SCR 30, the transistor is protected from the initial severe surge current through the lamp and assumes the load only after the lamp increases in resistance with temperature rising in the filaments. At this point, the voltage drop across the transistor 26 falls to a value of 0.2 to 0.3 volts, whereas the drop across SCR 30 is approximately 1 volt. This results in triggering off SCR 30 with the balance of the square wave on-cycle of the lamp being carried by the transistor 26. Since the internal resistance of the transistor 26 is quite low, a voltage drop across the system may be in the vicinity of 0.45 volts.

The lamp is extinguished upon the occurrence of the next pulse at the junction 45, the time period between pulses determining the "on" time of the lamp. Upon the occurrence of this next pulse, the SCR inverter toggles, SCR 56 turning "on" and SCR 38 "off". Base drive to transistor 26 is removed causing transistor 26 to become non-conductive thereby interrupting current flow to the lamp. At the instant of SCR 38 triggering non-conductive, pulse transformer 32 delivers a strong reverse pulse, by virtue of collapse of energy stored during the "lamp-on" cycle, to the gate of SCR 30, which tends to inhibit a false turn-on of SCR 30 during the "off" interval of the transistor 26. The diode 82 across the gate terminals of SCR 30 prevents excessive reverse bias of this gate. Thus, the lamp is energized and de-energized alternately with the toggling of the two SCR's 38 and 56, the "lamp-on" time being determined by the time spacing between pulse at junction 45. Alteration of this time spacing may be effected by adjusting the variable resistor 50.

If a short circuit is applied at the start or during energization of the lamp, a sudden drop is produced across transistor 26 which results in a drop in the base circuit and SCR 38 becoming non-conductive. This triggers the inverter and SCR 56 becomes conductive. At the next pulse at junction 45 SCR 38 is rendered conductive; however, if the short persists, SCR 30 will become conductive ahead of transistor 26 protecting the latter. If the "B" supply circuit is properly fused, the fuse will blow cutting off power. Thus, shorts in the lamp circuitry will not result in damage switching transistor 26.

In some vehicular installations, manual switches are connected in series with the lamp 20 as indicated by the dashed line configuration of a single pole single throw switch 86 in FIG. 1. With power applied to the circuit, and upon opening of the switch 86, the SCR inverter 38, 56 will cycle as previously described with the switching transistor 26 being rendered conductive in consonance with the SCR 38. If the switch 86 is closed while the switching transistor 26 is conducting, a full initial surge current taken by the lamp will pass through the transistor 26 causing damage. Thus, it is important that in any installation in which the lamp itself is switched into and out of the main circuitry, some provision be made for protecting further the switching transistor 26. This protection is provided by the sensing circuit now to be described.

Referring to FIG. 2, a time constant circuit composed of a resistor 88 and capacitor 90 is connected between the lamp terminals 16 and ground. The junction of this time constant circuit 88, 90 is connected to the base of a transistor 92 which in turn has its collector connected to the gate 54 of transistor 46 and its emitter to the cathode of the SCR 38 via a diode 94. A resistor 96 providing a relatively high resistance discharge path for the capacitor 90 is connected between this capacitor and the emitter of transistor 92. A diode 98 is shunt connected across the resistor 88.

Turning off the lamp connected to the terminals 16 and 18 during normal operation of the flashing circuitry, or in the alternative merely unplugging the lamp, will result in operation of the sensing circuitry as follows. Generally, capacitor 90 will be charged through the resistor 88 from the voltage appearing at the terminals 16. The time constant of the circuit 88, 90 is chosen so that during a normal "lamp-on" cycle, capacitor 90 cannot become sufficiently charged to render transistor 92 conductive (this transistor being normally non-conductive). During the "lamp-off" interval, capacitor 90 discharges through the lamp filament via diode 98, so transistor 92 cannot be rendered conductive.

Now assuming that the lamp is removed from the terminals 16 and 18, leakage, through transistor 26 and resistor 100 (having a fairly high resistance), causes capacitor 90 to charge to a level at which transistor 92 becomes conductive. The emitter of transistor 92 is returned to the cathode of SCR 38 by diode 94. As long as SCR 38 is conductive, the emitter of transistor 92 is near the supply voltage potential; hence, the base drive of transistor 92 is overcome by the high emitter voltage level. When SCR 38 becomes non-conductive, near ground potential is applied to the emitter of transistor 92 and the charge on capacitor 90 becomming sufficiently high triggers transistor 92 into conductive state thereby virtually grounding the emitter 54 of transistor 46. This stops the transistor 46 from oscillating. SCR 56 is now conductive since SCR 38 is non-conductive and will remain so until the lamp is reapplied to the terminals 16 and 18 and capacitor 90 is discharged. Upon discharging of this capacitor 90, transistor 92 is rendered non-conductive which thereby allows transistor 46 to resume its oscillatory operation. The inverter composed of SCR 38 and 56 will once again toggle causing intermittent flashing of the lamp. SCR 56 being conductive during lamp disconnection from the terminals 16 and 18 assures that upon reapplication of the lamp to these terminals, SCR 30 will always fire before transistor 26 thereby preventing surge load from causing damage to transistor 26.

Recapitulating, upon removal of the lamp from the circuitry of terminals 16 and 18, the sensing circuit which includes the transistor 92 disables the relaxation oscillator (transistor 46) resulting in SCR 38 turning "off" and SCR 56 "on." With SCR 38 "off," switching transistor 26 cannot be turned "on." Thus, if a lamp is reconnected to the terminals 16 and 18, no damage can occur to switching transistor 26 since it is non-conductive along with SCR 38.

Figure 3:
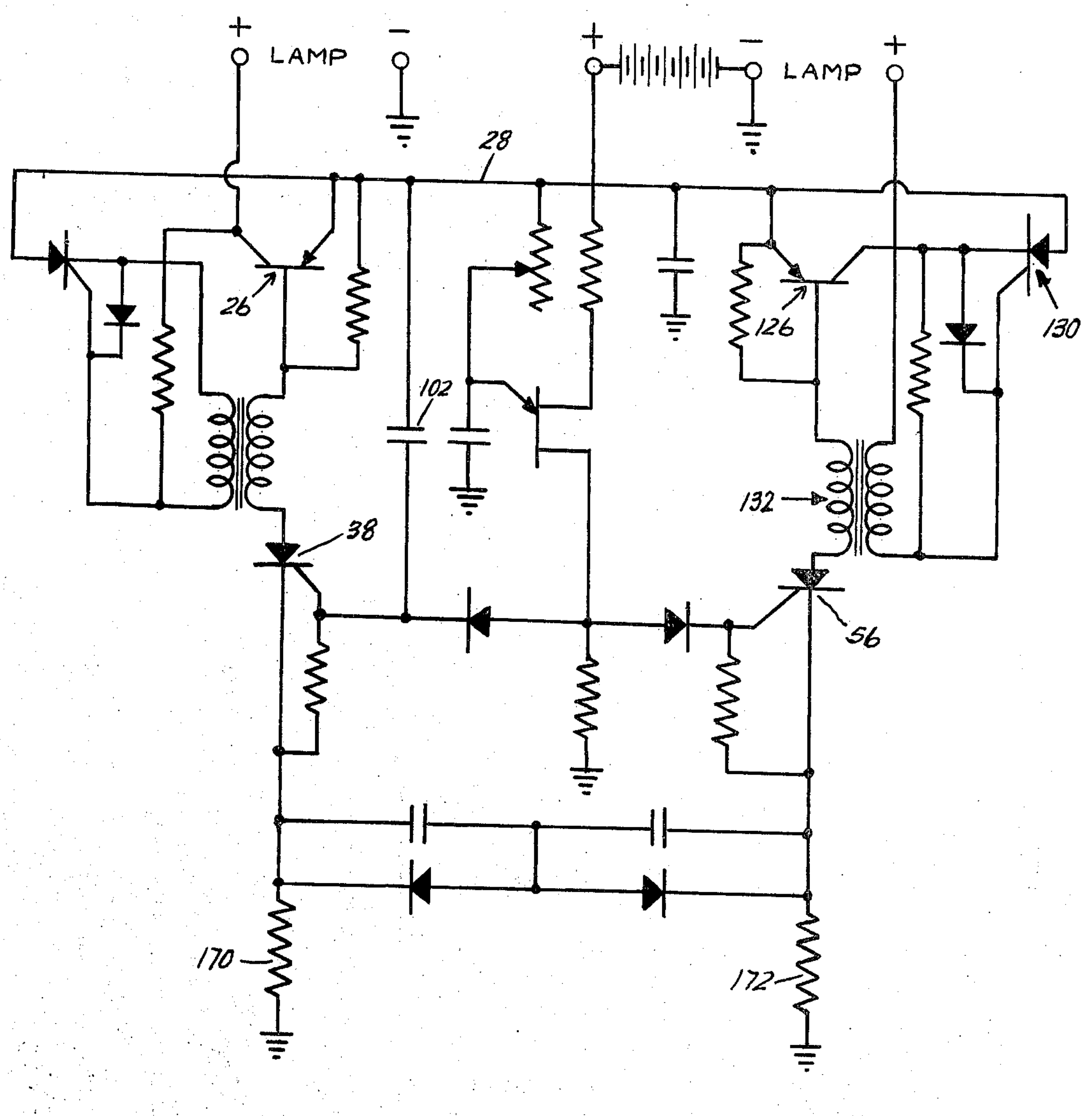
FIG. 3 is a circuit diagram of a second working embodiment.

Another embodiment of the invention is shown in FIG. 3 wherein two lamp circuits are provided which are alternately energized and de-energized. This circuit is essentially the same as that of FIG. 2 with the exception that the sensing circuit which includes transistor 92 has been omitted and secondly there is added a switching transistor 126, a shunt connected SCR 130, a transformer 132 and associated components like those components in FIG. 2 identified by the numerals 26, 30 and 32. A capacitor 102, however, has been added between the supply line 28 and the gate of SCR 38. The SCR inverter circuit which includes SCR's 38 and 56 toggles the same as previously explained alternately rendering the two transistors 26 and 126 conductive and non-conductive correspondingly energizing and de-energizing the lamps connected thereto.

Instead of using the transformer 34 circuitry (FIGS. 1 and 2) as the gate potential-generating device, it will be understood that a resistor-capacitor-diode network (not shown) may be used, however, the transformer 34 circuitry is preferred.

In a working embodiment of this invention, the components have the following listed values. It is to be understood, however, that the invention is not to be limited to these particular values but is to be given the scope of protection as afforded by the claims appended hereto.

| | |
|---|---|
| Transistor 26 | CP2511 |
| SCR 30 | ISO8 |
| SCR 38, 56 | CS28 |
| Resistors 44, 70 | 15 ohms |
| Transistor 46 | 2N4871 |
| Resistors 48, 76, 78, 84 | 27 ohms |
| Resistor 50 | 50,000 ohms |
| Capacitor 52 | 10 MFD |
| Diodes 58, 60, 94, 98 | IN4001 |
| Capacitors 62, 64 | 200 MFD |
| Diodes 66, 68 | 1N4001 |
| Resistor 72 | 350 ohms |
| Capacitors 74, 102 | .1MFD |
| Capacitors 80, 90 | 50 MFD |
| Diode 82 | IN457 |
| Resistor 88 | 68,000 ohms |
| Transistor 92 | 2N2924 |
| Resistor 96 | 4,700 ohms |
| Resistor 100 | 47,000 ohms |
| Resistors 170, 172 | 47 ohms |

While there have been described above the principles of this invention in connection with specific apparatus, it is to be clearly understood that this description is made only by way of example and not as a limitation to the scope of the invention.

What is claimed is:

1. A circuit for use in an electronic flasher comprising first and second normally non-conductive semiconductor switching devices each having a control element and two current-conducting elements, said current-conducting elements being coupled in shunt, two flasher-lamp electrodes and two power supply electrodes series connected with said current-conducting elements of one of said switching devices, and means for applying periodic switching potentials simultaneously to both said control elements for rendering both said switching devices conductive, said first switching device having a faster response time to the application of said switching potentials than said second switching device whereby said first switching device is rendered conductive in advance of said second switching device, said first switching device requiring a predetermined potential difference across its current-conducting elements to maintain its conductive state whereby a lesser potential difference thereacross occurring in response to said second switching device becoming conductive renders said first switching device non-conductive.

2. The circuit of claim 1 in which the resistance of the series circuit of the current-conducting elements of the second switching device and flasher-lamp electrodes is lower than the series circuit of the current-conducting elements of the first switching device and the flasher-lamp electrodes.

3. The circuit of claim 1 in which said first switching device is an SCR and said second switching device is a transistor, the current-conducting elements being the anode and cathode of the SCR and the emitter and collector of the transistor, said control elements being the gate of the SCR and base of the transistor.

4. The circuit of claim 3 wherein said means for applying switching potentials includes a third semiconductor switching device series connected with the base of said transistor and a source of switching potential.

5. The circuit of claim 4 including a gate potential-generating device coupled between said gate and said base.

6. The circuit of claim 5 in which said gate potential-generating device includes a transformer having primary and secondary windings, said primary winding being series connected with said base and said third switching device, said secondary winding being connected across the gate and cathode of said SCR.

7. The circuit of claim 1 wherein said means for applying switching potentials includes a third semiconductor switching device series connected with the control element of said second switching device and a source of switching potential, a fourth semiconductor switching device in a series circuit with said power supply electrodes, circuit means interconnecting said third and fourth switching devices for alternately rendering cyclically the latter conductive and non-conductive, and starting means for rendering said fourth switching device conductive upon initial application of unidirectional supply potential to said power supply electrodes.

8. The circuit of claim 7 in which said third and fourth switching devices are SCR's and said interconnecting circuit means being a capacitor commutated SCR timing inverter which includes a relaxation oscillator that generates, repetitively time spaced voltage pulses, for triggering said third and fourth SCR's, said starting means including a capacitor coupled between the gate of said fourth SCR and one of said power supply electrodes.

9. The device of claim 6 in which said third switching device is a third SCR, said source of switching potential including a resistor series connected between one power supply electrode and said base with said third SCR being series connected between said resistor and the other of said power supply electrodes, a diode having its anode connected to the cathode of said first SCR and its cathode to the gate thereof, and a resistor connected across said gate and cathode to minimize chances of false-triggering of said first SCR.

10. The circuit of claim 5 including automatic switch-off circuitry which comprises a first time constant circuit connected across said flasher-lamp electrodes, said time constant circuit including a series connected resistor and capacitor, and means responsive to a predetermined charge on said capacitor for disabling said periodic potential means.

11. The circuit of claim 10 in which said periodic switching potentials are time spaced, the time of said time constant circuit being shorter than the spacing between said switching potentials.

12. The circuit of claim 11 in which said third switching device is a third SCR, said source of switching potential including a resistor series connected between the power supply electrode which is connected to said transistor and said base with said third SCR being series connected between said resistor and the other of said power supply electrodes, a fourth SCR in a series circuit with said power supply electrodes, said third and fourth SCR's further being connected as a part of a capacitor commutated SCR timing inverter triggered by a relaxation oscillator that generates repetitively time spaced voltage pulses, said oscillator including a second time constant circuit of a resistor and capacitor connected to the gate of a unijunction transistor, the other side of the capacitor being connected to said other power supply electrode, a second normally non-conductive transistor having its base connected to the juncture of the resistor and capacitor of said first time constant circuit, the emitter of said second transistor being connected to the cathode of said third SCR, a resistor series connected between said cathode and said other power supply electrode, the collector of said second transistor being connected to the gate of said unijunction transistor, whereby said predetermined charge on said first time constant capacitor renders said second transistor conductive and thereby short circuits said second time constant capacitor to disable said relaxation oscillator.

13. The circuit of claim 12 including a diode having its anode connected to the emitter of said second transistor and its cathode connected to the cathode of said third SCR.

14. The circuit of claim 12 including a leakage resistance connected across the emitter-collector of said first transistor, and a diode shunt connected across the resistor of said first time constant circuit, the cathode of the last-mentioned diode being connected to one flasher-lamp electrode.

* * * * *